United States Patent [19]

Aceti

[11] Patent Number: 4,693,370

[45] Date of Patent: Sep. 15, 1987

[54] PALLET

[75] Inventor: John G. Aceti, Princeton Junction, N.J.

[73] Assignee: RCA Corporation, Princeton, N.J.

[21] Appl. No.: 663,709

[22] Filed: Oct. 22, 1984

[51] Int. Cl.$^4$ .............................................. B65D 19/44
[52] U.S. Cl. ..................................... 206/488; 206/329; 206/490; 108/55.1; 29/739; 29/799; 29/824; 269/50; 269/54.5; 198/465.1; 198/692; 198/803.15; 414/222; 901/50
[58] Field of Search ............... 198/345, 472, 648, 656, 198/465.1, 465.2, 465.3, 692, 693, 803.01, 803.2, 803.8, 803.15; 206/386, 595, 596, 598, 329, 488, 490; 108/55.1, 55.3, 55.5; 29/33 P, 559, 563, 568, 718, 721, 739, 759, 760, 772, 784, 799, 824; 269/16, 53, 54.5, 309, 310, 47, 50; D34/38; 414/222-226; 901/50

[56] References Cited

U.S. PATENT DOCUMENTS

| 2,205,495 | 6/1940 | Schmitt . | |
| 2,240,717 | 5/1941 | Read | 198/656 X |
| 2,698,076 | 12/1954 | Nilsson | 198/656 |
| 3,140,773 | 7/1964 | Cheh . | |
| 3,199,552 | 8/1965 | Nordfors | 198/803.8 X |
| 3,538,997 | 11/1970 | Christine | 198/656 X |
| 3,561,618 | 2/1971 | Lindbom . | |
| 3,777,885 | 12/1973 | Barteck . | |
| 3,819,194 | 6/1974 | Grevich et al. | 198/803.8 X |
| 4,036,381 | 7/1977 | Nielsen et al. | 414/222 X |
| 4,040,533 | 8/1977 | De Boer et al. | 198/472 X |
| 4,403,687 | 9/1983 | Stevens et al. | 198/472 |
| 4,492,301 | 1/1985 | Inaba et al. | 198/648 X |
| 4,533,038 | 8/1985 | Richard | 198/656 X |

FOREIGN PATENT DOCUMENTS 12262 of 1911 United Kingdom .

Primary Examiner—Robert J. Spar
Assistant Examiner—Lyle Kimms
Attorney, Agent, or Firm—Joseph S. Tripoli; William Squire

[57] ABSTRACT

A pallet for feeding components to a robotic assembly system at accurate reference locations and orientations includes a pair of parallel sheet members rigidly secured together. One sheet member has an array of locating apertures for receiving and locating a plurality of the components in the reference locations and orientation. The other sheet member has an array of rubber grommets, a grommet corresponding to each locating aperture for automatically receiving and releasably, frictionally engaging a component placed in a locating aperture.

10 Claims, 6 Drawing Figures

PALLET

This invention relates to a pallet assembly for releasably securing an array of workpieces in predetermined corresponding spaced reference locations and orientations.

Pallets carry a plurality of workpieces and are in wide use in a variety of manufacturing environments. One particular environment includes an automatic robotic assembly system which consists of a programmable robot and feed systems for feeding preoriented workpieces to the robot. Robots are generally employed in relatively low volume production systems because they are easily reprogrammed for different implementations and are not as rapid as automated, dedicated machinery.

Robotic system reliability usually falls on the workpiece feeding system and, thus, these systems are relatively important. Three kinds of feeding systems are usually employed and include vibrating feeding, magazine feeding, and pallet feeding. Vibratory feeding is most common and popular since it allows for the automatic orientation and feeding of bulky workpieces. The other two methods require manual orientation and placement of workpieces before feeding. Magazine feeding is especially popular when using electrical components since many suppliers provide those components preoriented in the magazine.

Pallet feeding is employed when workpieces cannot be vibratory fed or easily supplied in magazines. Pallet feeding is also popular because suppliers of the components preassemble the components to the pallets. Pallets are generally formed with many different designs. Most basically, one such design may comprise an "egg carton." Each workpiece is separately carried roughly preoriented in its own nest in the pallet, the orientation being determined by mating features of the nest and carried workpiece. The robot then accurately aligns the workpiece by transferring it from the "egg carton" to a precision alignment tool. This tool "fine tunes" the workpiece orientation to the precision required for its final assembly. This is relatively time consuming. The "egg carton," however, has been widely adapted to a variety of tasks since the "egg cartons" are low cost and useful with large numbers of workpieces and since preoriented workpieces are required by most low-cost robots. Suppliers of mass produced components usually supply their components in such "egg cartons."

Pallets for robotic assembly may be fabricated in a number of different ways. In some cases, a plate with holes may be employed or, for improved workpiece retention and location, a low-cost plastic bowl is molded to the shape of the received workpiece.

In the pallet feeding system, the roughly oriented workpieces are transferred between work stations by the pallet. Sometimes the workpieces while so nested, may shift slightly due to vibrations of the pallet motion and this shift causes problems. In particular, such shifting is undesirable in an automatic robotic system in which the exact orientation and location of a given workpiece is required. Pallets, which may contain many workpieces in an array, are not generally employed to accurately locate the workpieces for final assembly purposes. A typical robot employed with a given pallet will have no way of ascertaining that a given workpiece on the pallet has shifted position, even slightly, from its required orientation, for example, by a fraction of an inch. Such a shift is not readily observable by an operator controlling such an automatic system and will usually pass unnoticed to the robot. Therefore, most pallet systems include the intermediate alignment tool to insure accurate orientation of the workpiece prior to its assembly to mating elements.

A pallet for releasably securing an array of workpieces in predetermined locations and orientations according to the present invention comprises first means adapted to receive and locate each workpiece in its predetermined location and orientation. Second means secured in spaced relation to the first means includes a resilient workpiece friction gripping means adjacent to each location. The gripping means is adapted to resiliently and frictionally engage and hold the workpiece to the first means in the predetermined location and orientation upon the receiving of the workpiece by the first means.

In accordance with a feature of the invention a rubber element is employed. The rubber being of high coefficient of friction and readily compliant, easily receives in interference fit therewith a workpiece assembled to the pallet. As a result, transfer of the pallet to different work stations can occur without displacement of the workpieces from their respective reference locations.

Figure 1:
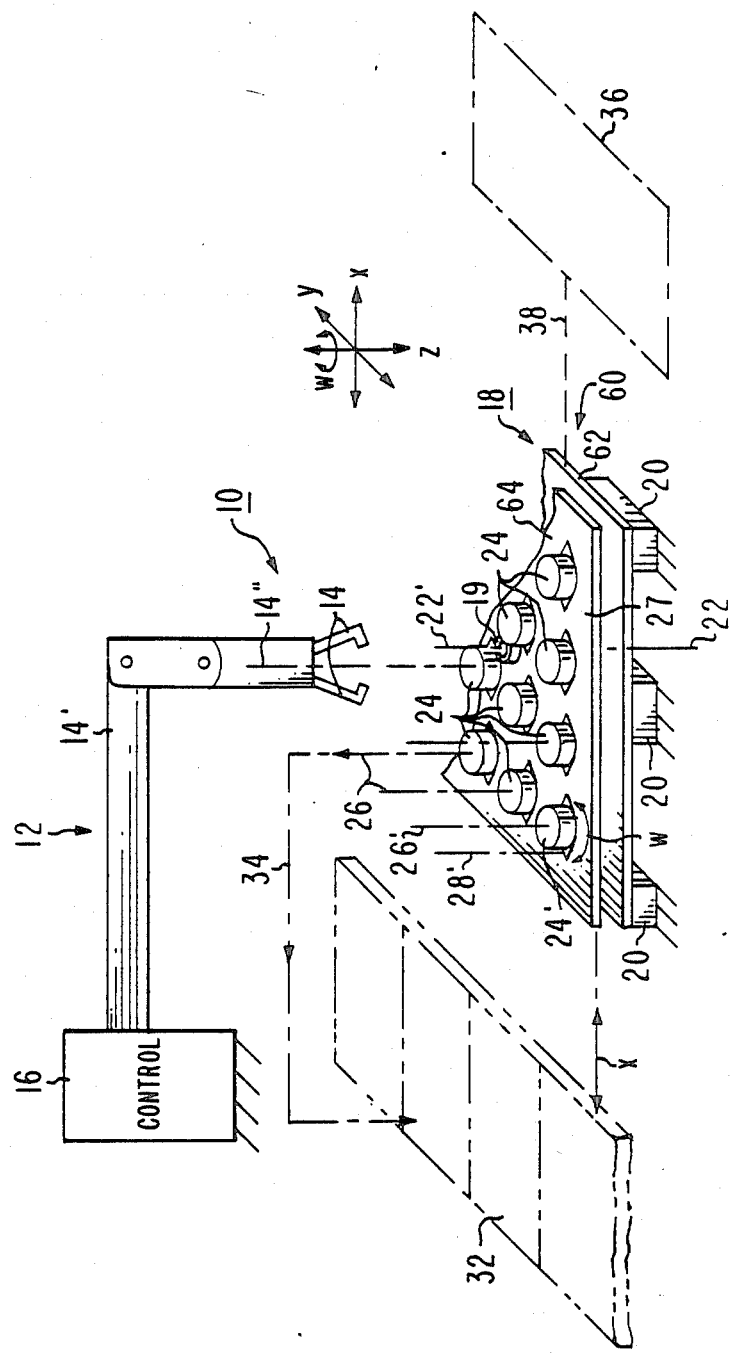
FIG. 1 is an isometric view, partially in phantom and partially diagrammatic, of a pallet feeding system in accordance with one embodiment of the present invention.

In FIG. 1, robotic system 10 includes a robotic assembly 12 having workpiece gripping fingers 14 attached to arm 14' and movably controlled by control 16. Control 16 is operated by a computer (not shown) for directing the motions and positions of the fingers 14 in a known way. A pallet assembly 18 embodying the present invention is conveyed to a reference location, axis 22, by a conveying system 20. The pallet assembly 18 carries a plurality of identical workpieces 24. The workpieces 24 are all aligned in identical reference orientations and in spaced reference locations relative to axis 22.

For example, each workpiece 24 is centered on a pallet vertical axis 26 parallel to pallet reference axis 22', FIG. 1, in an assigned x-y coordinate relative to that pallet reference axis. Each workpiece is secured on a reference surface, such as surface 27, of pallet 18, to locate the workpiece in the vertical directions, and is angularly oriented about axis 26 in directions $\omega$, FIGS. 4 and 6. Axes 26 are defined by the spacing mating element axes on workpieces 24 and assembly 18 as will be discussed later. Axis 28 is also a reference, as will be explained. These reference axes and surfaces locate and orient all of the workpieces 24 relative to robotic assembly 12 which is programmed to operate on such oriented and located workpieces. Those workpieces, however, can not shift position, even slightly, on pallet assembly 18 because such a shift will interfere with the operation of robotic assembly 12. This pallet assembly 18 precludes the need for the time consuming prior art intermediate alignment tool.

Each pallet 60 includes several locating bosses 19 (only one being shown) which accurately locate the pallet 60 at the work station. Each boss 19 has a locating aperture 21 (only one of which is shown) each of which mates with a locating guide pin (not shown) secured to conveying system 20, FIG. 1. The guide pin aligns the array of workpieces carried on pallet assembly 18 relative to the robotic assembly 12, and, in particular, relative to the robot finger axis 14". In the figures, boss 19 is concentric with pallet axis 22' which is aligned with conveying system 20 axis 22. The other boss (not shown) is aligned with a second corresponding guide pin and axis of system 20.

Control 16 is programmed in a known way to move the arm 14' and locate its gripping fingers 14 centered on axis 14" in alignment with a designated pallet axis 26 to progressively grasp the different workpieces. The fingers 14 lift the workpiece, and transfer it to a work station carrying an element, such as a printed circuit board 32 (shown in phantom). The workpiece is then attached in a given orientation to the board 32. The workpieces need to be accurately oriented when grasped by fingers 14 in order to be properly attached to printed circuit board 32. By way of example, workpieces 24 can be potentiometers which need to be oriented precisely relative to mating mounting holes in circuit board 32. Any misorientation of the workpieces 24 relative to the vertical z directions or the horizontal x and y directions or the angular directions ω relative to the z axis will result in improper assembly of that workpiece to that printed circuit board.

The workpieces 24 are assembled to the pallet assembly 18 at a component assembly station 36 shown in phantom. The pallet assembly 18 carrying the workpieces is then transferred in directions 38 to the robotic assembly position, FIG. 1. To preclude possible misorientation of the workpieces 24 during transfer to system 20, the workpieces, according to the present invention, are releasably, frictionally, slidably gripped and held in place automatically as the workpieces are placed on the pallet assembly 18 so that they will not shift in any of the reference x, y, z, and ω directions regardless any vibrations of the pallet during transfer including placement of the pallet upside down relative to the force of gravity.

Figure 3:
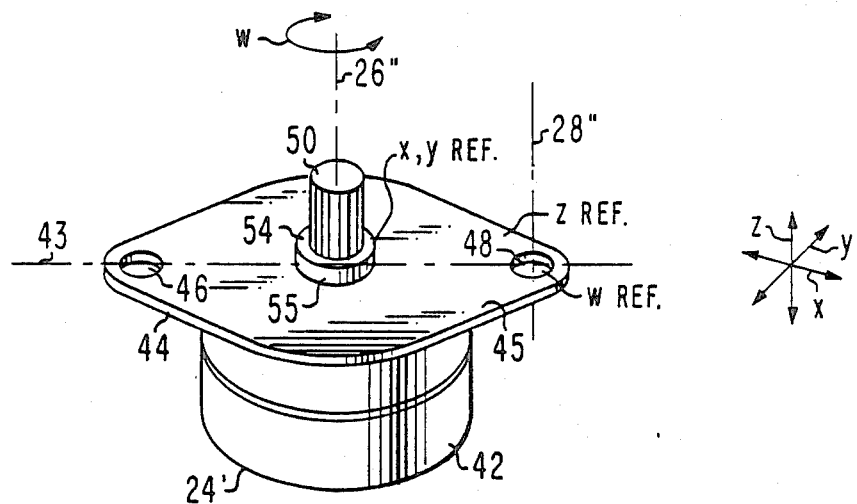
FIG. 3 is an isometric view of one component employed with the embodiment of FIG. 2.

The workpieces employed in the present embodiment of FIG. 1, are identical, but this is not essential. In FIG. 3, potentiometer 24' is representative of the construction of the remaining workpieces 24, FIG. 1. In the figures, primed and unprimed reference numerals on potentiometer 24' and pallet assembly 18 refer to the same elements. The following description of potentiometer 24' and its placement on pallet assembly 18 is representative of the construction of pallet assembly 18 for the remaining workpieces.

In FIG. 3, potentiometer 24' includes a circular cylindrical housing 42 secured to a plane flange 44 in which are two locating and mounting apertures 46 and 48 which need to be accurately located relative to two corresponding apertures (not shown) on printed circuit board 32, FIG. 1. Each aperture 46 and 48 lies on and is symmetrical with a line 43, FIG. 3, passing through potentiometer 24' axis 26". The potentiometer 24' has an operating shaft 50 which rotates about axis 26" for setting the value of the potentiometer. Shaft 50 passes through and rotates relative to circular cylindrical disc-like boss 54 secured to flange 44. Boss 54 has a peripheral edge surface 55 which is concentric with axis 26".

In FIG. 3, one of the apertures 46, 48, for example, aperture 48 serves as an ω reference locating point relative to axis 26'. Aperture 48 is employed to locate the line 43 relative to axis 26' when potentiometer 24' is attached to assembly 18. The apertures 46 and 48 need to be referenced because they need to be precisely aligned with mating printed circuit board apertures (not shown) to which potentiometer 24' is secured on the pallet assembly 18, FIG. 1. The flange 44 undersurface 45, FIG. 3, locates the potentiometer 24' in the vertical z direction on the assembly 18. The boss 54 peripheral edge surface 55 accurately locates potentiometer 24' axis 26" coaxial with pallet assembly axis 26', locating the potentiometer in given x and y orthogonal positions on assembly 18.

Figure 2:
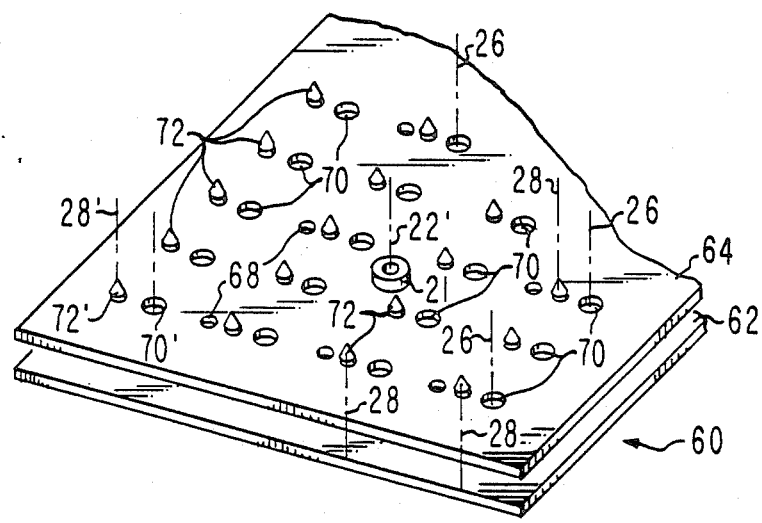
FIG. 2 is an isometric view of a fragmented portion of a pallet according to the embodiment of FIG. 1.

In FIG. 2, pallet 60 accurately locates and holds in position with means to be described an array of workpieces 24, such as potentiometer 24', regardless the pallet orientation relative to the force of gravity. Pallet 60 includes two parallel plates 62 and 64 which may be made of metal. The plates are rigidly secured together by a plurality of rigid tubular spacers 66 with screws 68, FIGS. 4 and 6, and by an array of tubular spacers 80 each secured in place by a locating pin 72. The pin 72' is press fitted into corresponding apertures 73 and 75 of respective plates 62 and 64 to firmly secure the pin thereto. Apertures 73 and 75 are in respective plates 64 and 62 in an array and correspond to each pin 72. The pallet 60 is advantageously formed of sheet material whose apertures can be readily formed by stamping or machining in large quantities at low cost. The spacers 66 and 80 are relatively low cost and commercially available. Spacers 66 and 80 are located in an array throughout the pallet 60 for maintaining the spaced relationship of plate 62 with plate 64 and are spaced sufficiently close for rigidizing the two plates between the spacers to maintain the plane of surface 27 accurately relative to the vertical z directions. Pins 72 are also employed to locate each corresponding potentiometer in the angular direction ω, as will be described.

In FIG. 2, plate 64 includes an array of locating apertures 70 of a given diameter each adapted to closely receive the peripheral edge of the boss 54 of a mating potentiometer. For example, aperture 70' receives edge 55 of boss 54, FIG. 3. Each aperture 70 of the array is located accurately on its reference axis 26, all axes 26 being parallel to and having given x, y coordinates relative to locating axis 22'. Once axis 22' is aligned with conveyor system axis 22, the robotic assembly 12 is programmed to "know" the exact x, y position of each pallet aperture 70. The robot assembly 12 is also programmed to "know" the exact location of assembly 18 upper surface 27 and the relative angular orientation in directions ω of each potentiometer about its corresponding axis 26.

The array of guide and locating pins 72 are secured to plates 62 and 64, for example, by press fitting. Each pin 72 is secured adjacent to a corresponding aperture 70 in plate 64 a given spacing and angular orientation in direction ω relative to that aperture. That is, each pin axis 28 is located in a given orientation and spacing relative to an aperture 70 axis 26. For example, pin 72' is centered on axis 28' which has a given orientation ω and spacing from corresponding aperture 70', FIG. 4.

Figure 4:
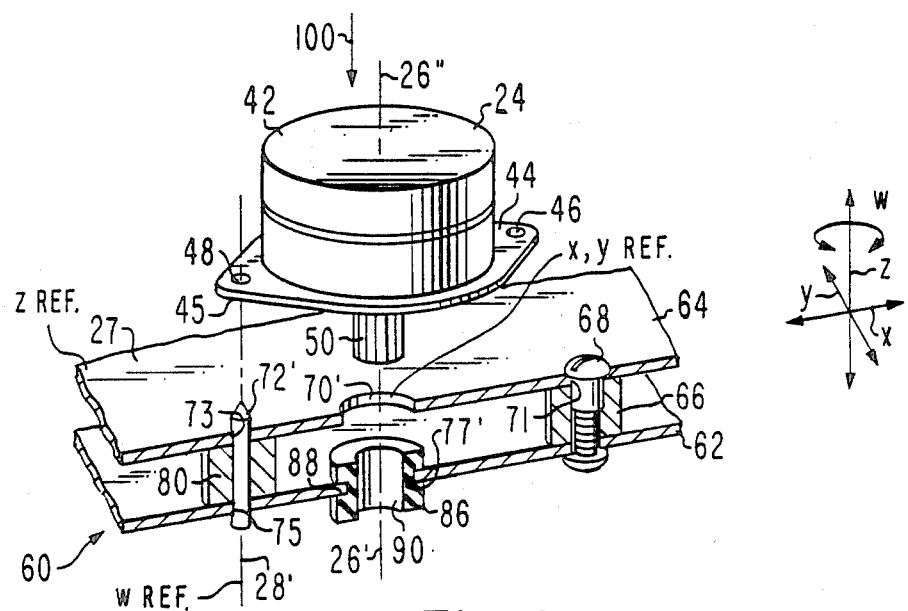
FIG. 4 is a partially exploded and partially sectional isometric view of the embodiment of FIG. 1.
Figure 6:
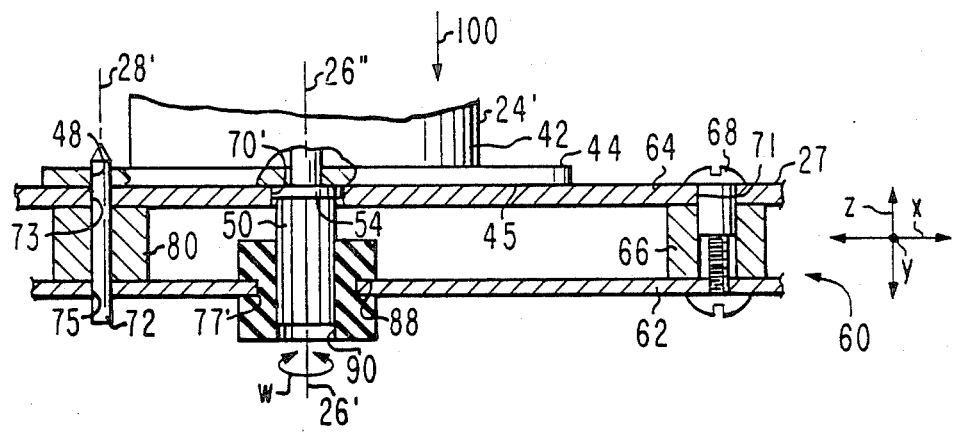
FIG. 6 is sectional view similar to the view of FIG. 4.
Figure 5:
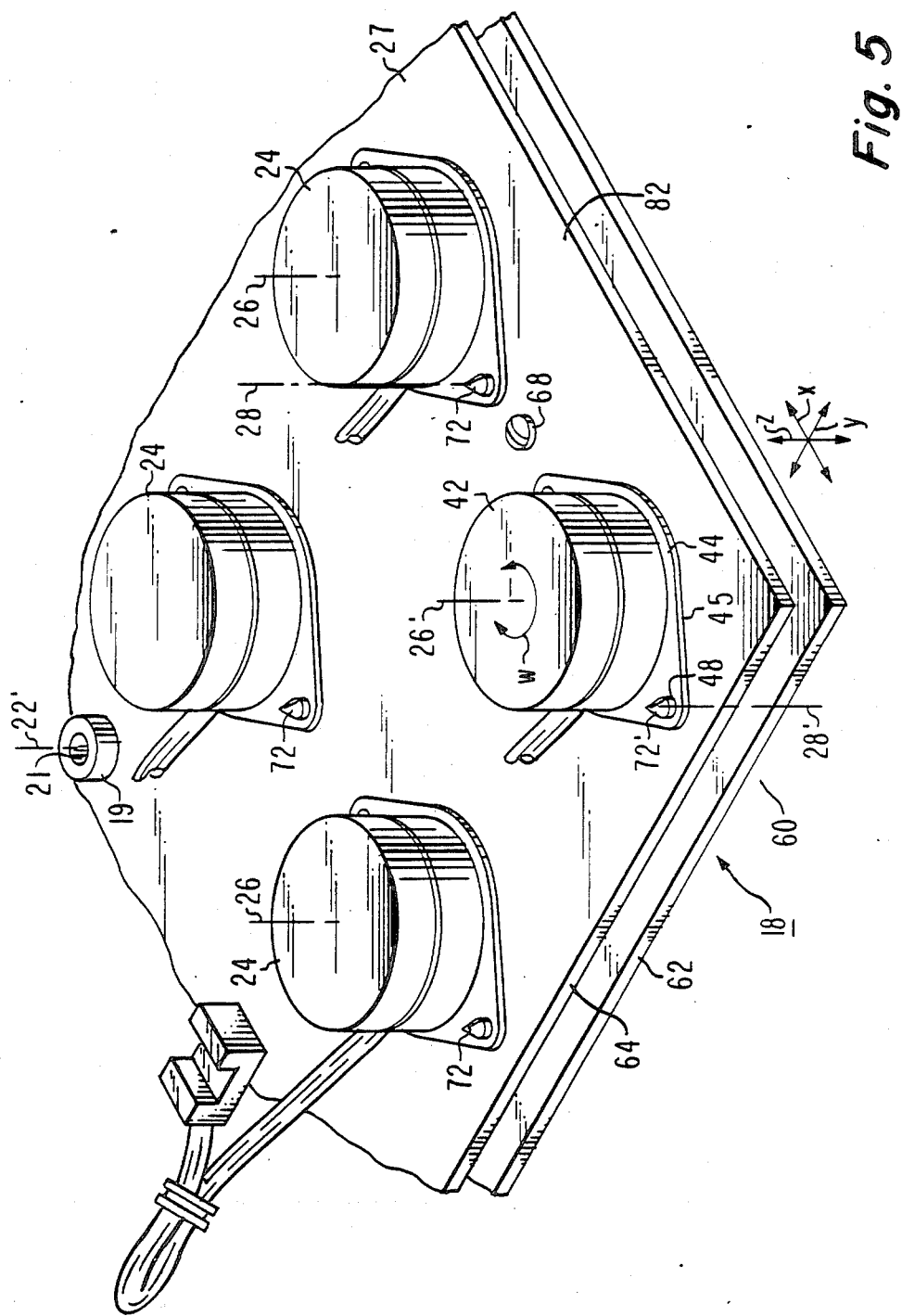
FIG. 5 is a more detailed isometric view of a pallet of the embodiment of FIG. 1.

Plate 62 includes an array of apertures, such as aperture 77', FIGS. 4 and 6, each aligned with a corresponding aperture 70 in plate 64 and concentric with a corresponding axis 26. A grommet 86 mates with and is in aperture 77'. Grommet 86 is a compliant rubber tube having a circumferential groove 88 about midway its axial length and having a cylindrical central opening 90 concentric with axis 26'. Grommet 86 is inserted into its locating aperture 77' by pushing it through aperture 77' until groove 88 engages and locks to plate 62, the grommet being larger in diameter than aperture 77' and relatively resilient. This automatically aligns the grommet opening 90 concentric with the corresponding pallet assembly axis 26' A grommet 86 is secured in each plate 62 aperture 77. The grommets 86 are commercially available in the configuration described in FIGS. 4 and 6.

In operation, the workpieces 24, FIG. 1, are assembled onto the pallet 60 at the component assembly station 36 by manual or automatic means (not shown). The workpieces, for example, potentiometer 24', FIG. 4, are pushed in the downward direction 100. This action abuts flange undersurface 45 with plate surface 27. This inserts boss 54, FIG. 6, into the corresponding pallet apertures 70 and 70'. Each aperture 70 and 70' locates a boss 54 accurately in the x, y directions coaxial with the corresponding axis 26. Locating flange 44 aperture 48 is inserted in a corresponding pin 72 and 72', aligning each housing 42 and its flange 44 relative to the corresponding axes 26 and 28. That pushing action, whether manual or automatic, inserts shaft 50 into the grommet hole 90, FIG. 4.

The grommet 86 compressively and resiliently holds shaft 50 thereto with a frictional force sufficient to preclude displacement of the workpiece from its assigned location and orientation. This force requires an equivalent force to remove the workpiece from the pallet 60. Such a force tends to minimize accidentally jarring or vibrating the workpiece loose when pallet 60 is moved. All of the workpieces are similarly assembled to the pallet 60 until the entire array of workpieces on the pallet 60 is assembled. The pallet 60 may include upstanding stanchions (not shown) for stacking similar pallets 60 at the work station adjacent the robotic assembly 12, FIG. 1.

While circular cylindrical grommets, such as grommets 86, have been illustrated in the present embodiment, it is apparent that other resilient rubber gripping elements may be employed. For example, a rubber element may be of any shape and secured to plate 62 aligned in interference fit with a mating surface of a workpiece attached to plate 64 so that the element resiliently, slidably, and frictionally engages that workpiece surface. It is apparent that such a gripping element surface need not be identically shaped as that of the abutting workpiece surface. What is important is that the element be sufficiently resilient and exert sufficiently high friction to easily hold the workpiece in place on the pallet. The friction element should have a sufficiently low holding force to permit the workpiece to be easily removed from the pallet under force of the robotic system yet, have a sufficiently high holding force to hold the workpiece in place should the pallet be jarred, vibrated, or oriented in any direction relative to the force of gravity.

In the embodiment illustrated, the boss 54, FIG. 3, need not be present. In this case, the plate 64 hole 70', FIGS. 4 and 6, could be dimensioned to locate the shaft 50 periphery directly. It is apparent that other bulky, complex workpieces whether they be transformers, or the like have surfaces thereof which can be used as reference locating surfaces in the x, y, z coordinates for releasably securing and locating that workpiece to a plane sheet member such as sheet 64 of pallet 60. Thus, workpieces having relatively complex shapes need not require corresponding, molded shaped receiving nested cavities in a precision workpiece locating pallet assembly. The pallet assembly according to the present invention may locate such a workpiece at a given plane in a reference aperture and grip the workpiece with a resilient friction gripping element.

What is claimed is:

1. A pallet for releasably securing an array of workpieces in predetermined locations and orientations comprising:

first means including a member having a plurality of circular apertures and adapted to receive and locate each workpiece on a member surface in a predetermined location on a respective axis and in a predetermined angular orientation about the respective axis; and second means secured in spaced relation to said first means including a resilient workpiece friction gripping means adjacent to each location and adapted to resiliently, releasably, and frictionally engage and hold the workpiece to said first means in said predetermined location and orientation upon the receiving of the workpiece by the first means;

each aperture serving as one of said predetermined locations, said member including an array of pins secured to a surface thereof, each pin corresponding to a different one of said apertures, each pin in a given radial position adjacent to the center of the corresponding aperture and adapted to engage a mating reference hole in the workpiece to be received and located in said corresponding aperture.

2. The pallet of claim 1 wherein said gripping means has a surface corresponding to a workpiece surface and being adapted to resiliently grasp that received element surface in interference fit.

3. The pallet of claim 1 wherein, each aperture corresponding to a separate, different workpiece for locating a given corresponding mating workpiece portion in first and second orthogonal directions.

4. The pallet of claim 1 wherein said second means includes a planar member having an array of apertures therein and a compliant rubber element adapted to receive and hold a corresponding workpiece thereto, each aperture corresponding to a separate, different one of said first means, each said aperture being adapted to receive and hold said rubber element.

5. The pallet of claim 4 wherein said rubber elements each comprise a tubular rubber member having an external annular groove, said annular groove being adapted to receive said planar member of the second means.

6. A pallet assembly for carrying, locating, and holding an array of workpieces, each in a predetermined location and angular orientation at that location comprising:

a first sheet member including workpiece locating means comprising an array of apertures, each passing through the first sheet member and adapted to releasably receive, angularly orient and locate a corresponding workpiece inserted therein, each said aperture and surface defining a separate, different predetermined location and angular orientation for each correspondingly received workpiece; and a second sheet member secured to the first sheet member, said second sheet member including a plurality of resilient elements secured thereto, each element adjacent to a corresponding one of said apertures, said elements and apertures being adapted such that said element releasably and frictionally abuts a surface of the received workpiece in interference fit thereto for securing that abutting workpiece to said first and second sheet members, said first member apertures each being circular holes, each said first member including an array of pins secured to a surface thereof, each pin corresponding to a different one of said apertures in the first sheet member, each pin in a given radial position adjacent to the center of the corresponding aperture and adapted to engage a mating reference hole in the workpiece to be received and located in said corresponding aperture.

7. The assembly of claim 6 wherein said workpiece has a circular cylindrical element depending therefrom and a flange member with said mating reference hole therein, each said apertures being dimensioned to closely receive and locate a cylindrical element therein.

8. The assembly of claim 6 wherein said workpiece includes a cylindrical member, said resilient friction element having a central aperture shaped the same as said cylindrical element and of smaller transverse dimension to compressibly receive said element therein.

9. A workpiece pallet for locating a workpiece relative to a reference angular orientation at a given location comprising:
a workpiece locating sheet member including a plurality of workpiece receiving and locating means, each locating means comprising an aperture adapted to receive and angularly locate a workpiece relative to said reference orientation and location in at least three orthogonal directions; and
a workpiece securing sheet member secured to the locating sheet member and including a plurality of workpiece gripping means, each for automatically releasably receiving and frictionally, slidably gripping a corresponding located workpiece when received;
said locating sheet member including an array of pins secured to a surface thereof, each pin corresponding to a different one of said apertures in that sheet member, each pin in a given radial position adjacent to the center of the corresponding aperture and adapted to engage a mating reference hole in the workpiece to be received and located in said corresponding aperture.

10. The pallet of claim 9 wherein said apertures for locating said workpiece in said three directions, the pins for locating said workpiece in a fourth angular direction relative to one of said three directions, said workpiece securing sheet members being dimensioned and constructed to hold said gripped workpiece thereto in any orientation regardless of effects of gravity.

* * * * *